Dec. 14, 1948. G. E. ATKINS Re. 23,057
SIGNALING SYSTEM
Original Filed Jan. 29, 1942 2 Sheets-Sheet 1
FIG. 1
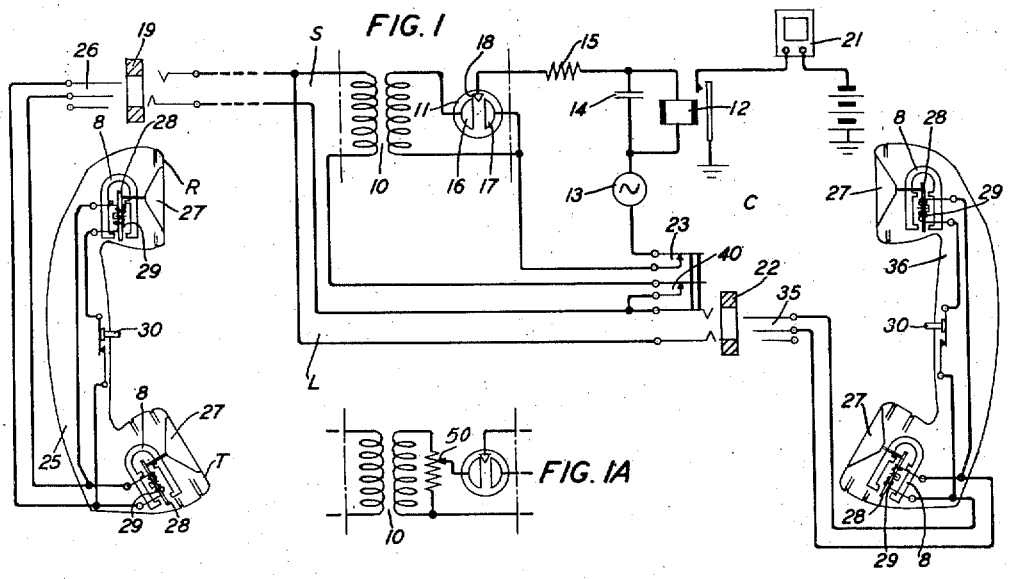
FIG. 1A
FIG. 2
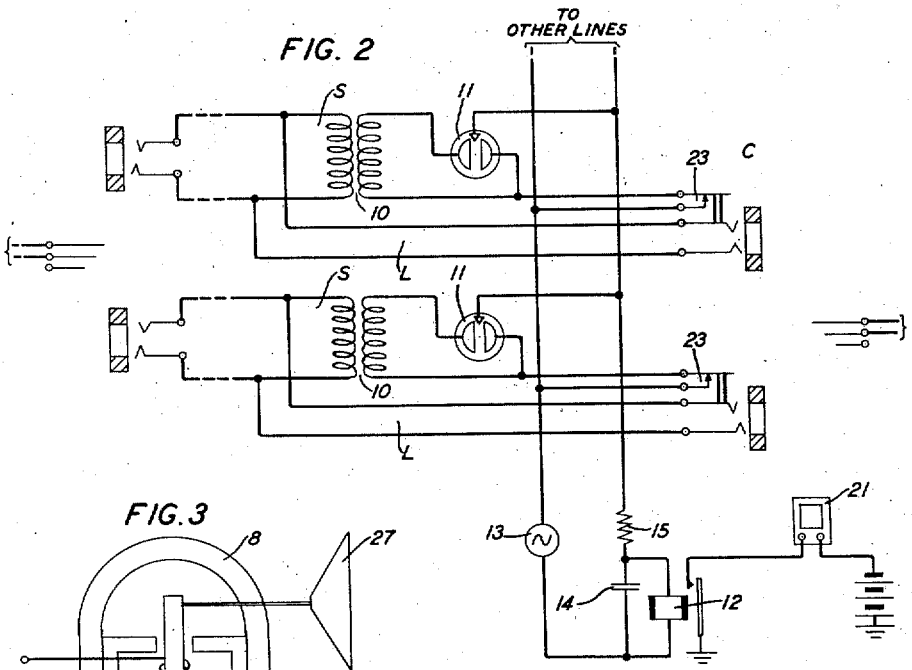
FIG. 3
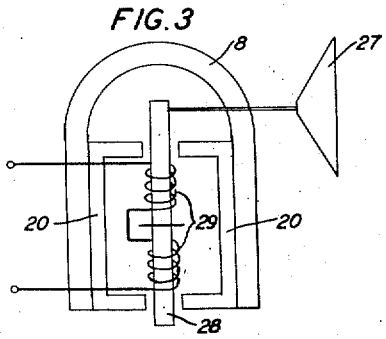
INVENTOR
G. E. ATKINS
BY
H. G. Kingman
ATTORNEY

SIGNALING SYSTEM

Original Filed Jan. 29, 1942 2 Sheets-Sheet 2

INVENTOR
G. E. ATKINS
BY
H. S. Kingman
ATTORNEY

Reissued Dec. 14, 1948

Re. 23,057

UNITED STATES PATENT OFFICE 23,057

SIGNALING SYSTEM

George E. Atkins, Glen Ridge, N. J., assignor to Bell Telephone Laboratories, Incorporated, New York, N. Y., a corporation of New York Original No. 2,332,043, dated October 19, 1943, Serial No. 428,680, January 29, 1942. Application for reissue May 14, 1946, Serial No. 669,475

31 Claims. (Cl. 179—36)

This invention relates to signaling systems and particularly to combined signaling and telephone communication systems of the type which are particularly suitable for use in connection with patrol services, either of a military or civilian character.

In military and civilian patrol services it is desirable that the patrolman, whether he be a sentry on a military post, or a watchman in an office building, be enabled to report in from a plurality of remote points to a central station, and also to communicate with the attendant at the central station, and to do so with a minimum of apparatus and as expeditiously as possible. In most systems of intercommunication between remote points and a central office, the patrolman is equipped with a portable telephone set which includes, as a separate mechanism, a signaling generator which must be manually actuated by the patrolman in order to transmit a call signal to the central station prior to the use of his telephone set for communication purposes.

It is the object of this invention to provide a combined signaling and communication system of the type briefly described above, which simplifies the operations performed by the sentry, or patrolman, and reduces to a minimum the apparatus required for the transmission of call and speech signals.

This object is attained in accordance with a feature of the invention by the provision of means, in a signaling circuit, which permits the use of a single sound translating device as the medium by which both call and speech signals may be transmitted from, and received at any of a plurality of remote stations. More specifically, the single sound translating device which functions both as a transmitter and receiver of call and speech signals may be in the nature of a sound-powered telephone unit which may be activated, in a normal manner, to transmit signals of the level of normal speech signals, and in a manner such as to generate signals of a level appreciably higher than the level of normal speech signals. The use of such a device obviates the need for a separate call signal generator and therefor, reduces the equipment carried by the patrolman or sentry to an absolute minimum.

In accordance with another feature of the invention, a signaling circuit is provided which discriminates between voice signals of normal level and acoustic signals of an appreciably higher level, and which embodies a call indicator which visually indicates, at a central station, the actuation of the sound translating device at a remote station by an acoustic signal of a level higher than the level of normal voice signals.

A further feature of the invention resides in the provision of means, in a signaling circuit, which functions to cause an answer-back signal to be transmitted back to a calling party, in order to advise him that the call signal initiated by him has been recorded at a central station.

A still further feature of the invention contemplates combining the signaling circuit with a speech transmission circuit so that telephone conversation may be carried on between the calling party and an attendant at a central station, and by designing the system in such a manner that the seizure of the speech transmission circuit, at the central point, automatically disables the signals which have responded to the transmission of a signal of a level higher than the level of normal voice signals.

Another feature of the invention provides for the use of the same signal device for call indicating and ring-off signaling purposes, and for the preparation of the signal device to receive a ring-off signal after it has been actuated as a call indicator.

Still another feature of the invention contemplates interconnecting a central station and a plurality of remote stations for communication purposes, and the provision of means at the central station for interconnecting any two remote stations for telephone communication purposes.

These and other features of the invention will be readily understood from the following description made with reference to the accompanying drawings in which:

Fig. 1 is a circuit diagram illustrating a combined signaling and telephone communication system which embodies features of the invention. The system illustrated in this figure involves a single remote station and a central station. The sound translating device used at each station is shown housed in a telephone handset housing of conventional contour. As illustrated, the telephone set comprises separate receiving and transmitting units. It is to be understood that a single unit, serving both as transmitter and receiver may be employed in place of the double unit shown.

Fig. 1–A is a partial circuit schematic illustrating an alternative form of circuit which may be used in place of the circuit portion of Fig. 1 included between the vertical broken lines thereof;

Fig. 2 is a circuit schematic illustrating an extension of the system shown in Fig. 1 to include a plurality of remote stations;

Fig. 3 shows in enlarged schematic form, the sound translating unit employed in the sound-powered telephones of Figs. 1 and 4.

Figure 4:
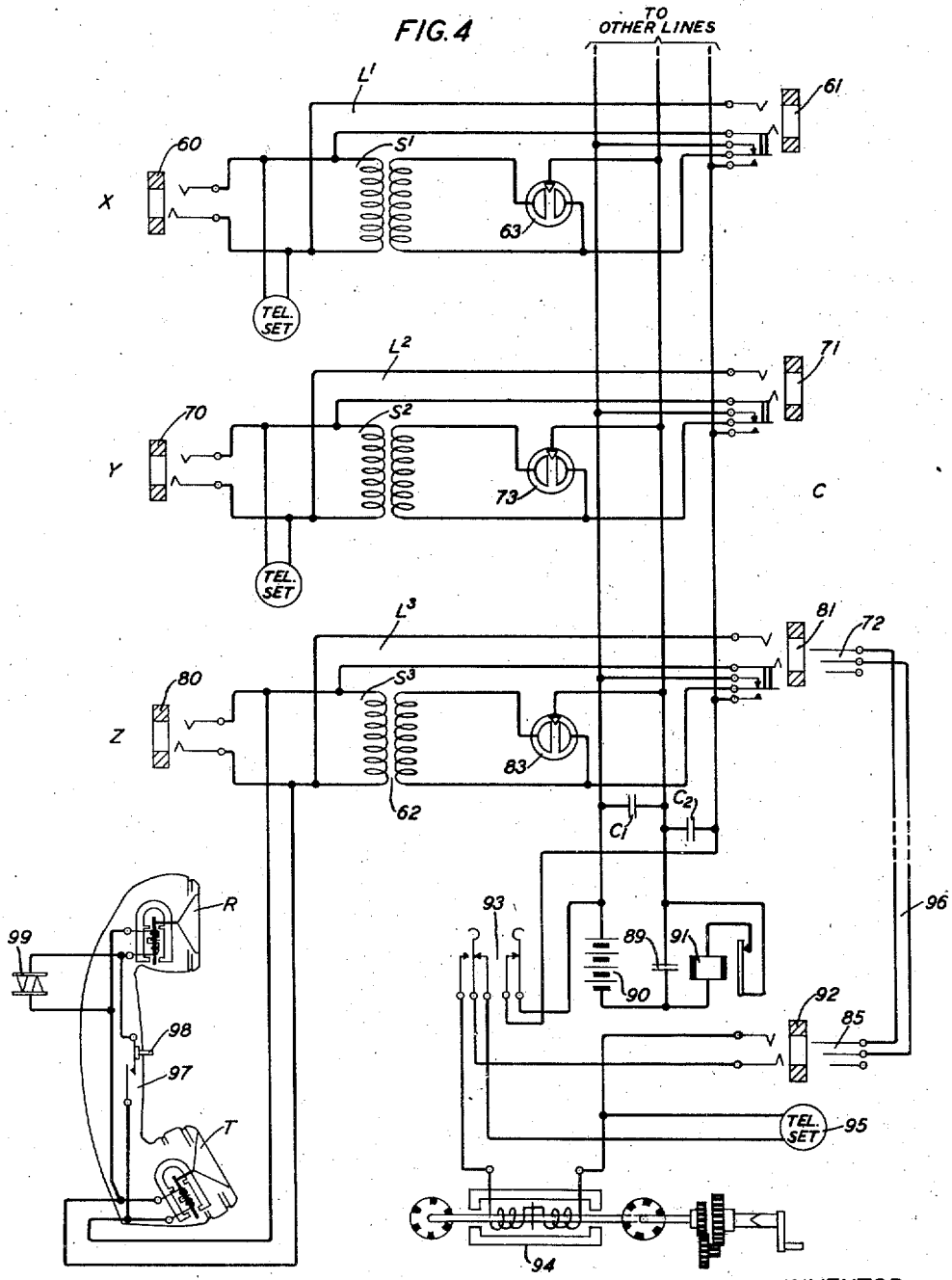
Fig. 4 is a circuit schematic illustrating an application of the combined signaling and telephone communication system of Fig. 1, wherein facilities are provided at a central point for completing telephone connections between remote stations.

The sound translating unit shown particularly in Fig. 3, may comprise a permanent magnet 8, two pairs of juxtaposed pole-pieces integrally formed on the magnetic elements 20 which are fixed to the permanent magnet in any suitable manner, a vibratile armature 28 having a portion thereof disposed between the pole-pieces, and a coil 29. The coil 29 may consist of two windings connected in series aiding. A diaphragm 27 is mechanically coupled to the armature 28 and is adapted to vibrate the armature in accordance with speech waves to induce an audible frequency current in the coil 29. Conversely, the diaphragm 27 is vibratable by the armature 28 in accordance with currents sent through the coil, to reproduce speech and other audible signals. While it may be desirable to employ a single unit which functions both as a transmitter and a receiver, the telephone of Fig. 1 is illustrated as a handset of conventional contour, with a sound-powered unit housed in each end, one of which is used as a transmitter and the other as a receiver. When such a telephone handset is employed, the two units have their coils connected in parallel, as illustrated, there being provided on the handset, a push button 30 which functions, when actuated, to open the circuit of the transmitter element when the handset is being used to receive incoming signals. Such a cut-out device, while not essential to successful operation of the handset, serves to remove the impedance effect of the transmitter when speech signals are to be received. In this manner speech signals are reproduced by the receiver unit at a higher level than they would be with both transmitter and receiver units connected to the circuit.

It is to be understood that the showing of a two-element handset is merely illustrative of a device which might better suit the convenience of the user, since it conforms, in style, to the handsets used for regular telephone service. As stated hereinbefore, a single unit will suffice, which functions both as transmitter and receiver. In this case, the device would be placed to the mouth and ear alternately, for the transmission and receipt, respectively, of sound signals.

The single unit, or the handset may be plug-ended so as to permit it to be readily associated with the jack terminations of the combined signaling and speech transmission circuit. In practice, and as shown in Figs. 2 and 4, there would be a line-terminating jack at each of a plurality of remote stations, which may be located at various points in the area patrolled by a watchman, sentry, patrolman, or the like.

Referring particularly to Fig. 1, the signaling circuit or channel S comprises a step-up transformer 10, a three-electrode gas-filled tube 11, a signal control relay 12, a source of alternating current 13, a condenser 14, and a resistance 15. The tube 11 includes a control electrode 16, a cathode 17 and an anode 18. The secondary winding of transformer 10 is connected across the control electrode 16 and cathode 17 of the tube 11, while the primary winding of the transformer is connected across the terminals of jack 19 by way of the contacts 40 of jack 22 at a central station C. The anode 18 and cathode 17 of tube 11 are connected in circuit with the alternating current source 13 by way of the operating winding of relay 12 and resistance 15. When relay 12 is energized, its armature closes a local supply circuit to the audible signal 21. The anode-cathode circuit of tube 11 includes the normally closed contacts 23 of jack 22 located at the central station. One conductor to the primary winding of transformer 10 is carried through the normally closed contacts 40 of jack 22.

The constants of tube 11 are such that, for signals of normal speech level, the potential applied to the control electrode 16 is insufficient in magnitude to "fire" the tube. However, when signals of a level appreciably higher than the level of normal speech are impressed on the control electrode, the tube does "fire." Once the tube is activated, the anode-cathode circuit is completed and is sustained even though the activating potential is removed from the control electrode. That is, when the tube "fires," it locks up independently of the potential impressed on the control electrode 16 and remains activated until the line L is seized by an attendant at the station C.

The method of operation of the system disclosed in Fig. 1 will now be described in detail.

Assuming a watchman, sentry, or the like, who is furnished with the plug-ended handset 25 desires to transmit a signal to the central station C, he inserts plug 26 associated with his handset into jack 19 and either shouts into the transmitter end of his set or taps it brusquely with his hand. This operation causes the transmitter diaphragm 27 to vibrate excessively which, in turn, causes the armature 28 to vibrate accordingly, with the result that an audible frequency current of a level appreciably higher than the level of normal speech signals is induced in the coil 29. This current generates a voltage in the primary winding of transformer 10 which is stepped up in the transformer secondary and impressed on the control electrode 16 of the tube 11. This voltage is sufficient in magnitude to break down the control gap and "fire" the tube. Once the tube is "fired," the control electrode loses control, and the anode circuit is effectively completed. Relay 12 whose operating winding is included in the anode circuit thereupon operates and completes an obvious circuit for the energization of the audible signal device 21. When the tube 11 operates, it functions also as a visual signal.

Since the anode circuit supply current is alternating, its amplitude passes though zero value twice for each cycle. In order to maintain the tube 11 activated and relay 12 operated after the cessation of the incoming signal, condenser 14 and resistance 15 are provided. The condenser charges up from the alternating current source 13 and when the value of the alternating current approaches zero, the condenser discharges through resistance 15 and the winding of relay 12, thereby sustaining the flow of current in the anode circuit and in the winding of relay 12.

Having thus actuated the transmitter T of his handset 25, the watchman may then operate the button 30 to open the transmitter circuit and, with the receiver R to his ear, listen for an answer-back signal. This signal is produced by virtue of the space current leakage between the anode 18 and control electrode 16 of tube 11. Due to this current leakage, a circuit is effected which extends from one terminal of the source 13, through the winding of relay 12, resistance 15, across the anode-control electrode gap of tube 11, secondary winding of transformer 10, contacts 23 of jack 22, back to the other terminal of source 13. The alternating current in this circuit induces a corresponding current in the transformer primary, which, in turn, traverses the coil 29 of the sound translating device of receiver R of the handset 25. The diaphragm of this device thereupon functions to produce an audible signal. This signal indicates to the listening watchman, or sentry, that the signal be initiated by actuating the transmitter T has been received at the central station C.

Upon receipt of the visual and audible signals at station C, the attendant thereat inserts plug 35 associated with the handset 36 into jack 22 in which the line L terminates. Insertion of plug 35 into jack 22 causes jack contacts 23 and 40 to be opened, the former causing the anode-cathode circuit of tube 11 to be interrupted, and the latter opening the primary winding of transformer 10. Opening of the anode-cathode circuit of tube 11 extinguishes the tube 11 and disables the signal 21. Opening the transformer primary reduces the loss which would otherwise be introduced by the shunt resistanec of the transformer primary to speech signals transmitted over the line L. Conversation may now be carried on between the watchman and the attendant through the medium of their respective telephones.

Fig. 2 requires no detailed description since it distiguishes from Fig. 1 only in that two remote stations are indicated instead of one, and the contacts 40 are omitted from the jacks at the central station. It is to be understood that any number of remote stations may be accommodated by this system, each of which would have its individual line circuit L and signaling circuit S, the latter of which would function to operate the common signaling equipment, such as ringer 21 and its individual visual signal or tube 11. It is also obvious that the double cut-out feature of the central station jack 22 of Fig. 1 may be incorporated in the jack structures shown in Fig. 2.

Fig. 1-A distinguishes from Fig. 1 only in that a potentiometer 50 is used in conjunction with the transformer 10 by virtue of which the tube 11 may be adjusted to operate when the "sound-powered" unit at the calling station is actuated by acoustic signals of different intensities.

Reference is now made to Fig. 4 which illustrates a further extension of the systems shown in Figs. 1 and 2. In this figure, the system has been developed further, to illustrate the use of direct current and also to provide facilities at a central point for completing connections between remote stations. In the figure there are indicated three remote stations X, Y and Z, though it is to be understood that the number of stations which can be accommodated in a system of the type disclosed is unlimited. At each station there is located a jack, 60, 70 or 80, each of which terminates a combined signaling and communication circuit comprising a signaling channel, $S^1$, $S^2$ or $S^3$ and a speech channel $L^1$, $L^2$ and $L^3$. Each combined signaling and communication circuit terminates a a central station in a jack, such as jack 61, 71 or 81. A common audible signal of the buzzer type, indicated at 91, functions as a common call signal when a call is initiated at any of the stations X, Y or Z.

The attendant's position at the central station C is also equipped with an operator's jack 92, a key 93, a signaling generator 94, a telephone set 95 and patching cords 96. As will be described in greater detail hereinafter, the apparatus located at the attendant's position at station C renders it possible for the attendant to answer calls incoming to the station C; to initiate calls to any of the remote stations X, Y and Z; and to complete connections between the remote stations.

The telephone set indicated by the numeral 95 is similar to the telephone set shown in Fig. 1 while the generator 94 is preferably of the type described and illustrated in Patent 2,144,867, issued January 24, 1939, to G. E. Atkins. This generator functions, when operated, to generate a tone signal of 1000 cycles.

As shown in detail at station Z, and schematically at stations X and Y, each line is provided with a telephone handset 97 substantially identical to the handsets shown in Fig. 1, which is permanently connected to the line terminating at the remote station. This handset distinguishes from the handsets shown in Fig. 1 in that the circuit to the transmitter element T is normally open at the contacts of push-button 98, and, in that a shock-absorbing varistor 99 is connected across the circuit when the transmitter and receiver elements are connected in multiple. The functions of these elements will appear from the description of the operation of the system which follows.

For purpose of illustration, is will be assumed that a party at station Z desires to communicate with a party at another remote station Y. The party at station Z initiates the call by picking up the telephone handset 97 and either shouting into the transmitter or tapping it in such a manner as to generate an acoustic signal of a level higher than the level of normal speech signals. Upon the actuation of the transmitter T of the handset 97 in this manner, the tube 83 flashes in a manner fully described in connection with the arrangement of Fig. 1. The tube 83 flashes as a call signal to identify the particular line upon which a call is awaiting the attention of the attendant at station C. The locking circuit for the tube 83 may be traced from the negative terminal of battery 90, winding, back contact and armature of buzzer 91, anode of tube 83 to the cathode thereof, normally closed contacts of jack 81 to the positive pole of battery 90. The buzzer signal 91 operates in this circuit and functions as a common audible signal.

By the operation of the buzzer 91, the voltage of battery 90 is repeatedly applied to the secondary of transformer 62 by way of the anode-control electrode space path of tube 83, causing a corresponding voltage to be impressed on the secondary of transformer 62 and thence upon the operating coil of the transmitter element T of the handset 97 at station Z and upon the operating coil of the receiver element R when push-button 98 is depressed. The diaphragm of the transmitter T and the receiver R are accordingly actuated to emit a tone signal which indicates to the calling porty at station Z that the call signal initiated by him has been received and is being recorded at the central station C. This signal is characterized as an answer-back signal.

Under normal conditions the plug 85 of the patching cord 96 at the central station C will be inserted in the operator's jack 92. Upon hearing the tone of the buzzer 91 and noting the flashing of tube 83, the attendant inserts the plug 72 into jack 81 associated with the visual signal 83. The lower normal contacts of jack 81 are thus opened causing an interruption of the locking circuit for tube 83, whereupon the tube 83 is extinguished and the buzzer 91 is silenced. At the lower alternate contacts of jack 81 a circuit may be traced from the negative pole of battery 90, winding, back contact and armature of buzzer 91, anode and cathode elements of tube 83, lower alternate contacts of jack 81, normal closed right-hand contacts of key 93 to the positive pole of battery 90. This circuit constitutes a substitute potential supplying circuit for the tube 83 which serves to prepare the tube 83 for the receipt of a ring-off signal as will be described more fully hereinafter. Should it happen that the insertion of plug 72 into jack 81 was accomplished so rapidly that the tube 83 did not have time to become deenergized during the operation of the jack transfer spring, the attendant can extinguish it by momentarily operating key 93 to disconnect battery 90 from the tube.

The attendant at station C may now converse with the calling party at the remote station Z by using the telephone set 95, it being noted that one side of the telephone set is connected directly to one of the jack springs of jack 92 while the other side of the telephone set is connected to the other jack spring, by way of the left-hand normally closed contacts of key 93. The party at station Z now informs the attendant at station C that a connection with remote station Y is desired. The attendant thereupon withdraws the plug 72 from jack 81 of the calling line and inserts it in jack 71 of the line extending to the desired station Y, and actuates the key 93.

Actuation of key 93 substitutes the ringing generator 94 for the telephone set 95, connecting it to the called line. Operation of the generator 94 in a manner fully described in the patent hereinbefore identified, causes the transmission of signaling current over the line $L^2$. It will be observed that though the signaling current from generator 94 is impressed directly across the primary of transformer $S^2$ and the tube 73 may flash during this time, the visual signal will not persist after the cessation of the transmission of signaling current since the locking circuit for the tube is now open both at the open contacts of jack 71 and the right-hand normal contacts of key 93. It follows, therefore, that though the tube 73 may respond to the transmission of signaling current from the source 94 it will flash only so long as the signaling current is being applied, and will then become extinguished as the locking circuits do not function in view of the absence of locking potential.

The signaling current transmitted from the source 94 over line $L^2$ activates the transmitter element of the telephone set associated with the jack 70. The transmitter diaphragm of the telephone set at station Y responds to the 1000 cycle signaling current in the same manner that it responds to speech signals. The transmitter element of the telephone set at station Y emits a sound signal of relatively great intensity, thereby functioning as a call signal to indicate to the party at station Y that a call is awaiting attention. Since it is possible that the party at station Y may place the receiver element to his ear while signaling current is being received and, therefore, subject himself to an acoustic shock, the shock absorbing varistor 99 is provided which functions when the handset push-button (such as push-button 98) is closed, to connect the receiver to the line, to preclude the possibility of such a shock being experienced by the answering party.

The party at station Y in responding to the incoming call communicates directly with the attendant at station C, it being understood that the key 93 is restored to normal immediately after the actuation of the generator 94, to reconnect the attendant's telephone set to the patching cord. The attendant at station C informs the party at station Y that the party at station Z is waiting to be connected with the station Y.

The plug 85 is now withdrawn from the operator's jack 92 and inserted into jack 81 associated with the calling line. The stations Y and Z are now interconnected through the patching cord 96 and private conversation between the parties thereat may be carried on, each party using their respective handset, such as the handset 97, for this purpose. A separate patching cord may be used should another call come into the central station while the patching cord 96 is connected to the lines of stations Y and Z.

At the termination of conversation between the parties at stations Y and Z the attendant is advised that the connection may be taken down in the following manner. Either of the parties at stations Y and Z transmits a "ring-off" signal by actuating the handset transmitter element in such a manner as to cause it to generate a signal of a level appreciably higher than the level of normal speech signals. Upon such an operation, the tube 73 and/or tube 83 flash in the manner previously described, and lock in circuits including the lower alternate contacts of jacks 71 and 81, respectively, and the normal right-hand contacks of key 93. Upon receipt of these signals the attendant withdraws the plugs 72 and 85 from jacks 71 and 81 respectively, and may reinsert one of them into the jack 92 in preparation for the handling of other incoming calls.

When transfer is made from one to the other locking circuit by means of the transfer springs in the jack of one station, a transient voltage produced by breaking of the contacts is impressed on the locking circuit which is common to other stations. This voltage may be of sufficient amplitude to "fire" other tubes. Condensers $C_1$ and $C_2$, one for each locking circuit absorbs such transients and presents false signals.

By virtue of the transfer spring of the line jacks 61, 71, 81, etc. any station, such as station X, may initiate a call to the central station while the stations Y and Z are interconnected by the patching cord 96. Should a call be initiated at station X at such a time, the tube 63 and buzzer 91 would function in a manner similar to that described in connection with the transmission of a call signal from station Z. The tube 63 locks operated in a circuit which includes the normally closed transfer contacts of jack 61 and will remain operated until the attendant is available to answer the call. The tube signal 63, and all other similar signals such as 73 and 83, when operating as a call signal, lock independent of the key 93, but when such signals function to indicate a "ring-off," the locking circuit for the tubes then includes the operated transfer contacts of their associated jacks and the right-hand normal contacts of key 93. Therefore, when the key 93 is actuated to knock down any tube when operated as a "ring-off" signal, the locking circuit for any other tube which may have been operated as a call signal will not be disturbed. In this manner only those tube signals which have been operated to indicate a "ring-off" will be deenergized when the key 93 is operated regardless of the number of tubes which are in an illuminated condition at the time.

The system illustrated in Fig. 4 is such as to render it conveniently possible to assemble the equipment at station C on a switchboard of unit design. Such a switchboard would consist of a single operator's unit comprising the jack 92, key 93, telephone set 95, generator 94 and buzzer 91; a plurality of line units each comprising a jack, such as jack 81, a tube, such as tube 83 and a transformer, such as transformer $S^3$, and a chassis comprising a plurality of multicontact sockets, each of which accommodates a multicontact plug to which each line unit or operator's unit is wired. Such an arrangement renders it possible for any unit to be removed from the switchboard and replaced by another unit with a minimum of effort, and also permits any number of switchboard sections being connected in multiple to increase the line capacity of the board as conditions warrant it.

It is to be understood that the system illustrated in Fig. 4 functions equally well when alternating current is employed in place of the direct current source 90. It will also be apparent that the condenser 89 may be omitted if the buzzer signal 91 is designed to operate fast enough so as to prevent the deenergization of the tube signals between interruptions.

It will be noted that the system disclosed will function as a completely operative system of telephone communication in the event of a power failure. The tube signals will operate to indicate incoming calls to the central station even though the alternating or direct current sources 13 or 90, respectively, have failed. In this case the signals do not lock operated.

The system of this invention renders it possible for a patrolman, sentry, or the like, to transmit call or alarm signals to a central point by using the same instrumentality employed in transmitting speech signals, thereby obviating the need for auxiliary ringing or signaling equipment, such as a hand-operated generator or some equivalent mechanism. It also provides a simple, yet effective means for appraising the calling party of the fact that a signal, the transmission of which he initiated, is recorded at the central station. It further constitutes a simple, compact and highly efficient intercommunicating system whereby calls between remote stations may be completed and supervised at a central station.

It is apparent that the transmission of call signals from the remote stations may be accomplished by means other than a sound translating device. Such signals may be transmitted by momentarily connecting battery, of sufficient voltage, across the line conductors or by momentarily shorting the line to which battery is supplied from the central station. Such voltages may also be produced by means of condenser discharges.

What is claimed is:

1. The combination in a signaling system of a signaling circuit, a sound transmitting device capable of translating sound signals of the level of normal speech signals and sound signals of appreciably higher levels, and a visual signaling device for indicating, in a continuous manner, the translation, by said device, of an instantaneous sound signal of a level appreciably higher than the level of normal speech signals.

2. In combination in a signaling system, a sound-translating device, a signaling circuit associated with said sound-translating device, a signaling device included in said signaling circuit responsive to an instantaneous actuation of said sound-translating device by an acoustic signal of a level higher than the level of normal speech signals, and means for maintaining said signal actuated after the instantaneous actuation of said sound-translating device.

3. The combination in a signaling system of a signaling circuit, and a sound-powered telephone associated therewith comprising a sound-translating device, said signaling circuit comprising a signaling device responsive to an instantaneous actuation of said sound-translating device for causing the actuation of said sound-translating device in a continuous manner as an answer-back signal.

4. The combination in a signaling system of a signaling circuit, a sound-translating device including an acoustically operable diaphragm, said signaling circuit comprising a three-electrode gas-filled tube which functions upon the operation of the diaphragm of said translating device by an acoustic signal of a level appreciably higher than the level of normal speech signals to indicate such operation, and to complete an answer-back circuit in which said sound-translating device is actuated to produce an answer-back signal, and means for sustaining the answer-back circuit after the operation of the diaphragm of said translating device by the acoustic signal of a level appreciably higher than the level of normal speech signals has ceased.

5. The combination in a signaling system of a signaling circuit, a sound-translating device operable as a transmitter to translate acoustic signals into electric currents and as a receiver to translate electric currents into audible signals, and a signaling device in said signaling circuit responsive to the operation of said translating device, as a transmitter, by acoustic signals of a level higher than the level of normal speech signals for causing the operation of said sound-translating device as a receiver.

6. In a signaling system, a calling station, a called station, a line circuit extending between said stations, an audible signal at said called station, a sound-translating device at said calling station operable both as a transmitter and as a receiver, a signaling circuit, means for connecting said sound-translating device to said signaling circuit and to said line circuit, means included in said signaling circuit responsive to the actuation of said device as a transmitter, by an acoustic signal of a level appreciably higher than the level of normal speech signals for causing the operation of said signal device, and means responsive to the seizure of said line circuit at said called station for disabling said audible signal device.

7. In a signaling system, a calling station, a called station, a signaling circuit, a line circuit extending between said stations, a signal device at said called station, a sound-translating device at said calling station operable both as a transmitter and as a receiver, means for connecting said translating device to said signaling circuit and to said line circuit, means included in said signaling circuit responsive to the actuation of said translating device, as a transmitter, by an acoustic signal of a level higher than the level of normal speech signals for causing the operation of said signal device and of said translating device as a receiver, and means responsive to the seizure of said line circuit at said called station for disabling said signal device.

8. In combination, a line circuit, a signaling circuit, said circuits terminating at one end in common jack terminals, a sound-translating device, means for connecting said translating device to said common jack terminals, a signal device, and means included in said signaling circuit for discriminating between the operation of said translating device by acoustic signals of normal speech level and of levels higher than normal speech signals, whereby said signal device is operated when said translating device is actuated by an acoustic signal of a level higher than the level of normal speech signals and is inoperative when said translating device is actuated by acoustic signals of normal speech level.

9. In combination, a line circuit, a signaling circuit, said circuit terminating at one end in common jack terminals, a sound-translating device operable both as a transmitter and as a receiver, means for connecting said translating device to said common jack terminals, a signal device, means included in said signaling circuit for discriminating between acoustic signals of normal speech level and signals of levels higher than normal speech levels, whereby said signal device is operated when said translating device is operated, as a transmitter, by an acoustic signal of a level higher than the level of normal speech signals, and is inoperative when said translating device is operated, as a transmitter, by acoustic signals of normal speech level, said discriminating means also functioning upon the operation of said translating device, as a transmitter, by an acoustic signal of a level higher than the level of normal speech signals to cause the operation of said translating device as a receiver, and means responsive to the seizure of said line circuit at the other end for disabling said signal device.

10. In combination, a sound-translating device operable both as a transmitter and receiver, a signaling circuit comprising a gas-filled tube having an anode, a cathode and a control electrode, a signal control device and a source of current connected between the anode and cathode elements of said tube, and means for coupling said sound-translating device to said signaling circuit, comprising a step-up transformer having a primary winding connected to said translating device and a secondary winding connected across the control electrode and the cathode of said tube.

11. In combination, a sound-translating device operable both as a transmitter and as a receiver, and a signaling circuit adapted to be connected with said translating device and comprising a signal control device, a source of current, a gas-filled tube having an anode, a cathode and a control electrode, means comprising a step-up transformer for impressing a voltage on the control electrode of said tube commensurate with an acoustic signal of predetermined level impressed on said translating device when used as a transmitter, whereupon said tube is activated and space current is caused to flow from said source of current in a circuit including the anode and cathode of said tube to cause the operation of said signal control device, and whereupon a second path for space current is effected which includes said source of current, said anode, said control electrode and the secondary winding of said transformer, which space current causes the actuation of said translating device as a receiver.

12. In a signaling system, a calling station, a called station, a signaling circuit, a line circuit extending between said stations, a signal device at said called station, a sound-translating device at said calling station, means for connecting said translating device to said signaling circuit, means comprising a voltage discriminating device having an input circuit included in said signaling circuit, said voltage discriminating device being responsive to the actuation of said translating device by an acoustic signal of a level higher than the level of normal speech signals for causing the operation of said signal device, and means effective upon the seizure of said line circuit at said called station for disabling said signal device and for opening the input circuit to said voltage discriminating device.

13. In a telephone system, a line circuit, a signal device therefor, operable both as a call signaling device and a "ring-off" signaling device, and means operable to disable said signal device when operated as a "ring-off" signal and ineffective to disable said signal device when operated as a call signal.

14. In a telephone system, a line circuit terminating in a jack, a visual signaling device associated therewith, a locking circuit for said signaling device including normally closed contacts of said jack, a key, and means effective upon the seizure of said line circuit, by way of its terminating jack, for opening said locking circuit and preparing an auxiliary locking circuit for said signaling device including alternate contacts of the terminating jack and contacts of said key.

15. In a telephone system, a line circuit terminating in a jack, a signaling device associated therewith comprising a three-element gas-filled tube having an anode, a cathode and control electrode, a source of power, a locking circuit for said tube extending from one pole of said source of power to the anode of said tube and from the other pole of said source of power to the cathode of said tube by way of normally closed contacts of the line terminating jack, a key, and means effective upon the seizure of said line circuit by way of its terminating jack for connecting the cathode of said tube to the said other pole of said source of power by way of alternate contacts of the terminating jack and normal contacts of said key.

16. In a telephone system, a plurality of calling stations, a called station, a line circuit extending between each of said calling stations and said called station, each of said lines terminating at said called station in a jack, a locking visual signaling device for each of said lines, means at each of said calling stations for causing the energization of its corresponding visual signaling device, and means at said called station effective upon the seizure of said lines thereat by way of their respective jacks for deenergizing said visual signaling devices and for preparing them for reoperation as locking signals.

17. In a telephone system, a line circuit terminating in a jack, a signal device for said line circuit operable both as a call signal and as a "ring-off" signal, and means for disabling said device subsequent to its operation as a call signal and for preparing it for reoperation as a "ring-off" signal, said means comprising jack springs operable when said line is seized by way of its terminating jack.

18. In a telephone system, a line circuit extending between a called and a calling station, a signal device at said called station associated with said line circuit, means at said calling station for impressing on said line circuit an acoustic signal of a level higher than the level of normal speech signals to which said signal device responds as a call signal, a locking circuit for said signal device completed upon the operation of said signal device, and means responsive to the seizure of said line at the called station for interrupting said locking circuit to disable said signal device, and for preparing an auxiliary locking circuit for said signal device, whereby said signal device is rendered operable to record the transmission from said calling station, of an acoustic signal of a level higher than the level of normal speech signals while said line circuit is held seized at said called station.

19. In a telephone system, a line circuit terminating at one end in a jack, a visual signaling device for said line circuit adapted to operate and lock operated upon the transmission of a tone signal of predetermined level over said line circuit, means for transmitting a tone signal of predetermined level over said line, and a key for unlocking said visual signaling device and effective only after the seizure of said line by way of its terminating jack.

20. In a telephone system, a line circuit terminating at one end in a jack, a visual signaling device for said line circuit, means for operating said signaling device as a call signal prior to the seizure of said line by way of said jack, and as a "ring-off" signal subsequent to the seizure of said line, means effective upon the seizure of said line for disabling said signaling device when operated as a call signal, and a switching device effective subsequent to the seizure of said line for disabling said signaling device when operated as a "ring-off" signal.

21. In a telephone system, a line circuit extending between a remote station and a central station and comprising a call signal transmission channel and a speech signal transmission channel, means at the remote station for momentarily applying to said line an acoustically generated potential of a level higher than the level of normal speech signals, and means included in the call signal transmission channel of said line circuit for visually indicating the application of such potential to said line.

22. In a signaling system in which a sound translating device is acoustically actuated to generate both call signals and speech signals, the method of transmitting a call signal which comprises actuating the sound translating device by an acoustic signal of a level appreciably higher than the level of normal speech signals, and selectively recording the transmitted call signal.

23. The combination in a telephone signaling system of a sound translating device operable acoustically to transmit call signals and speech signals over a line, and means responsive selectively to the acoustic operation of said device in transmitting a call signal for recording the transmitted call signal.

24. A telephone system comprising a plurality of telephone sets, each having a transmitter and a receiver, a switchboard having a plurality of gas-type electronic tubes forming signalling means corresponding to each telephone set, each tube having a plate, a grid and a cathode, and being adapted to glow upon application of potentials of proper magnitude to the cathode, the plate and the grid, means applying a potential to said plate and cathode of insufficient magnitude to initiate the operation of the tube but of sufficient magnitude to continue the operation of the tube after it has been started, means electrically connecting each of said telephone sets to the grid of the corresponding tube, and means operable at said telephone set for supplying a sufficiently high potential to said grid over said electrically connecting means to ionize the gas in the corresponding tube and cause said tube to glow.

25. A telephone system comprising a plurality of telephone sets each having a transmitter and a receiver, a switchboard having a plurality of gas-type electronic tubes forming signalling means corresponding to each telephone set, each tube having a plate, a grid and a cathode, and being adapted to glow upon application of potentials of proper magnitude to the cathode, the plate and the grid, means for applying a potential to said plate and cathode, means electrically connecting each of said telephone sets to the grid of its corresponding tube, and a vibratable element operable at said telephone set for supplying a sufficiently high potential to said grid to ionize the gas in the corresponding tube and cause said tube to glow.

26. A telephone system comprising a plurality of telephone sets, each having a transmitter and a receiver, a switchboard having a plurality of gas-type electronic tubes forming signalling means corresponding to each telephone set, each tube having a plate, a grid and a cathode and being adapted to glow upon application of potentials of proper magnitude to the grid, plate and cathode, a separate jack at the switchboard for each of said telephone sets and connecting said telephone sets to said cathode and said grid of the corresponding tube, means for applying a potential to said cathode and said plate, means for supplying a potential to the plate and cathode of said corresponding tube of insufficient magnitude to cause said tube to glow, and means operable at each telephone set for supplying a potential to the grid of the corresponding tube of sufficient magnitude to cause the corresponding tube to glow.

27. A telephone system comprising a plurality of telephone sets, each having a transmitter and a receiver, a switchboard having a plurality of gas-type electronic tubes forming signalling means corresponding to each telephone set, each tube having a plate, a grid and a cathode and being adapted to glow upon application of potentials of proper magnitude to the grid, plate and cathode, a separate jack at the switchboard connected to each of said telephone sets, means electrically connecting said telephone sets to said cathode and to said grid of the corresponding tube, means including a pair of disengageable contacts in each of said jacks for applying a potential to said cathode and to said plate, means for supplying a potential to the plate and cathode of said corresponding tube of insufficient magnitude to cause said tube to glow, means operable at each telephone set for supplying a potential to the grid of the corresponding tube of sufficient magnitude to cause the corresponding tube to glow, an operator's telephone set at said switchboard having a plug to be received in any of said jacks, and means on said plugs for disengaging said disengageable contacts of the jack receiving the plug and extinguishing said tube.

28. A telephone system comprising a plurality of telephone sets, a switchboard for selectively connecting said telephone sets to each other, multiple element, gas-type electronic tubes at said switchboard corresponding to each telephone set, each tube being adapted to glow upon application of proper potentials to the elements thereof, means for applying to said elements potentials of insufficient magnitude to cause said tubes to glow but of sufficient magnitude to cause the tube to continue to glow after it has been started and means operable at said telephone sets for supplying a potential of sufficiently great magnitude to the corresponding tube to cause said tube to glow.

29. A telephone system comprising a plurality of telephone sets, a switchboard for selectively connecting said telephone sets to each other, three-element, gas-type electronic tubes at said switchboard corresponding to each telephone set, each tube being adapted to glow upon application of proper potentials to the elements thereof, means for applying to said elements potentials of insufficient magnitude to cause said tubes to glow, means operable at said telephone sets for supplying a potential of sufficiently great magnitude to the corresponding tube to cause said tube to glow, an operator's telephone set at said switchboard, means for connecting said operator's set selectively to any of the other telephone sets, and means operable upon connection of said operator's telephone set to another telephone set for disconnecting the corresponding tube from at least one of said means for supplying potentials.

30. In a telephone system having a plurality of telephone sets, the combination of a switchboard having a plurality of three-element, gas-type electronic tubes, each corresponding to a telephone set and being adapted to ignite and glow upon application of potentials of proper magnitude to the elements thereof, means for applying to the elements of said tubes potentials of insufficient magnitude to ignite the tubes but sufficiently high to cause the tubes to continue glow after ignition, means operable at each telephone set for supplying a potential sufficient to ignite its corresponding tube, and means operable at the switchboard for disconnecting at least one element of the tube from the potential supplying means to extinguish a glowing tube.

31. In a telephone system having a plurality of telephone sets, the combination of a switchboard having a plurality of three-element, gas-type electronic tubes, each corresponding to a telephone set and being adapted to ignite and glow upon application of potentials of proper magnitude to the elements thereof, means for applying to the elements of said tubes potentials of insufficient magnitude to ignite the tubes but sufficiently high to cause the tubes to continue glow after ignition, means operable at each telephone set for supplying a potential sufficient to ignite its corresponding tube, an operator's telephone set at said switchboard, contact means for connecting said operator's set selectively to any of the other telephone sets and simultaneously disconnecting at least one element of the corresponding tube from the potential supplying means, and means including said contact means operable at said switchboard for connecting said other telephone sets selectively to each other.

GEORGE E. ATKINS.

REFERENCES CITED

The following references are of record in the file of this patent:

UNITED STATES PATENTS

| Number | Name | Date |
|---|---|---|
| 2,302,544 | Halligan | Nov. 17, 1942 |